[11] 3,632,215

| | | | |
|---|---|---|---|
| [72] | Inventor | Eberhard Holtz | |
| | | Aachen, Germany | |
| [21] | Appl. No. | 23,401 | |
| [22] | Filed | Mar. 27, 1970 | |
| [45] | Patented | Jan. 4, 1972 | |
| [73] | Assignee | Carl Zeiss Stiftung | |
| | | Wuerttemberg, Germany | |
| [32] | Priority | Mar. 28, 1969 | |
| [33] | | Germany | |
| [31] | | P 19 15 891.9 | |

[54] APPARATUS FOR DETERMINING THE POSITION COORDINATES OF A POINT RELATIVE TO A REFERENCE POINT
5 Claims, 6 Drawing Figs.

[52] U.S. Cl..................................................... 356/114, 250/225, 356/172
[51] Int. Cl........................................................G01b 11/26, G01n 21/44
[50] Field of Search............................................ 356/114, 115, 116, 118, 153, 172, 152, 4; 250/225

[56] References Cited
UNITED STATES PATENTS

| 3,397,608 | 8/1968 | Ellis................................ | 356/116 |
|---|---|---|---|
| 2,651,771 | 9/1953 | Palmer............................ | 250/225 |
| 3,087,377 | 4/1963 | Daley............................. | 250/225 |
| 3,031,919 | 5/1962 | Collyer........................... | 356/115 |
| 3,551,057 | 12/1970 | Hamilton et al. .............. | 356/153 |

*Primary Examiner*—Ronald L. Wibert
*Assistant Examiner*—J. Rothenberg
*Attorney*—Sandoe, Hopgood & Calimafde ABSTRACT: For measuring the coordinates of one point relative to a reference point a linearly polarized laser beam from the reference point impinges upon a circular polarization filter of a measuring device at the point to be measured. The filter which consists of two semicircular filters whose directions of polarization are perpendicular to each other has a larger diameter than the beam. The filter or the polarization plane of the beam rotates about the center of the filter and a lens focuses the beam passing through the filter onto a photoelectric receiver to produce a current. If the filter is centered relative to the beam a direct current is only produced; if not, an AC component is generated. A phase-sensitive rectifier coupled to the receiver produces an electric signal whose phase and amplitude represent the angular position of the point of impingement of the beam relative to the center of the filter. The signal may be fed to an indicating device for indicating the coordinates represented thereby and/or may be fed to means, such as servomechanism, operable to move the measuring device until the filter is centered with the beam.

PATENTED JAN 4 1972 3,632,215
SHEET 2 OF 3
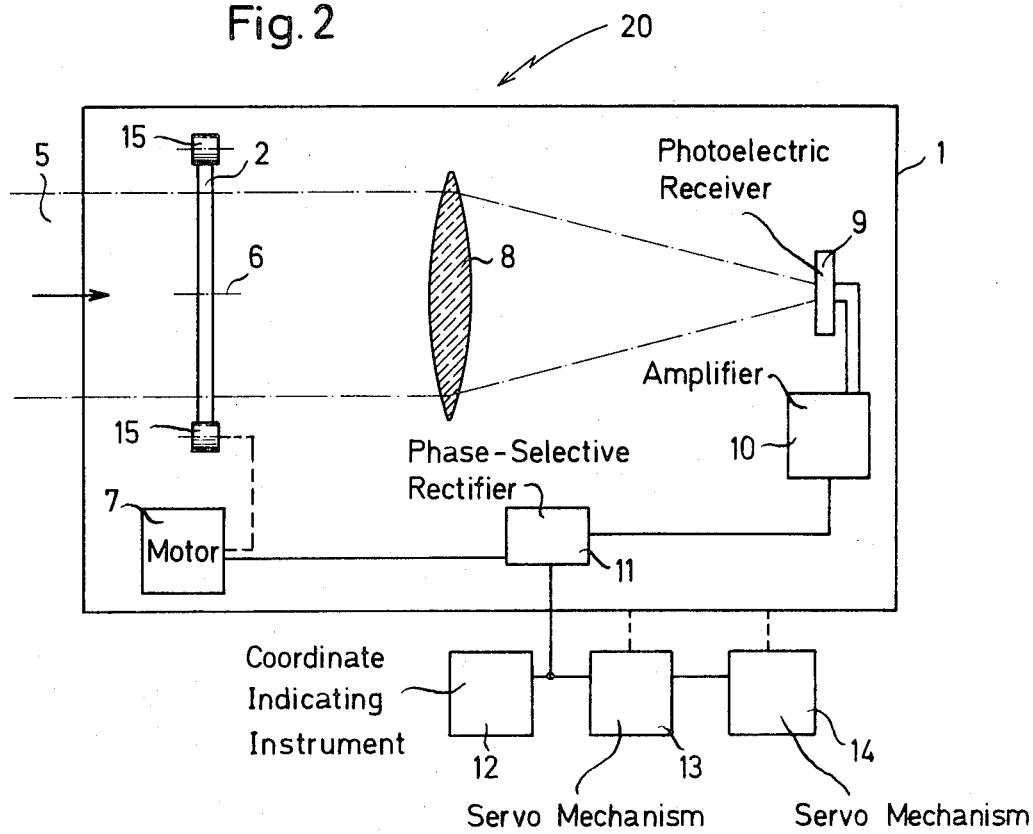
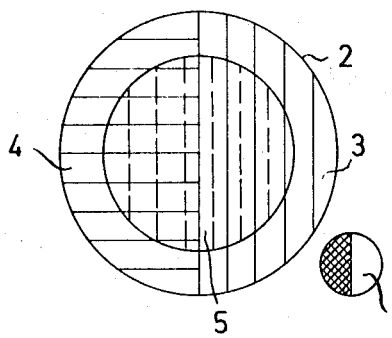
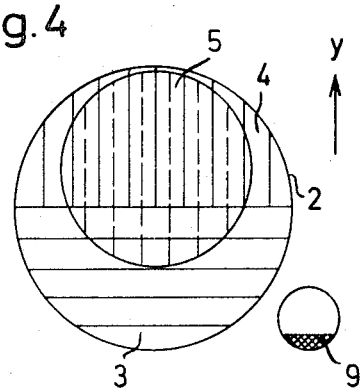
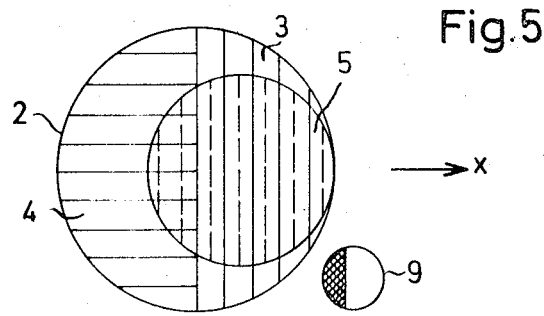

APPARATUS FOR DETERMINING THE POSITION COORDINATES OF A POINT RELATIVE TO A REFERENCE POINT

The present invention relates to apparatus for measuring the coordinates of one point relative to the position of a reference point. In particular the invention relates to apparatus for making such measurement by means of a linearly polarized laser beam directed to a measuring device which automatically measures the coordinates of the beam relative to the point at which the beam impinges upon the device.

Measuring height differences between various points in the field is usually done by the so-called geometric method wherein a graduated measuring stick held at the point to be measured is observed through the telescope of a transit which is placed at the reference point. This method requires an observer who operates the transit, consequently, it cannot be automated. In addition, it can only be used over relatively small distances, and cannot be used in poor light or at night.

It is an object of the present invention to provide apparatus to measure with adequate accuracy the position coordinates of a point relative to a reference point, this measurement being capable of automation and of execution over much longer distances than the geometric method and with out regard to the lighting conditions.

The apparatus according to the invention is characterized in that a linearly polarized laser beam generated at the reference point is directed to impinge upon a circular polarization filter which is disposed at the point to be measured. The filter rotates about its center relative to the polarization plane of the laser beam, its diameter is greater than that of the laser beam and it consists of two semicircular filters whose directions of polarization are perpendicular to each other. A lens focuses the beam passing through the filter on a photoelectric receiver which is connected to feed the current thus produced to a phase-selective rectifier which converts the current into an electric signal whose phase and amplitude represent the angle relative to the center of the filter, and the distance from said center of the point at which the center of the beam impinges upon the filter.

In one form the polarization filter rotates about its center relative to the stationary polarization plane of the laser beam. In another form the polarization filter is fixed and the polarization plane of the beam is rotated relative to the center of the filter. In this latter form a λ/4 (X4) disk and a simple polarization filter precede the stationary filter, which comprises two semicircular filters with their polarization planes perpendicular to each other.

The apparatus of this invention is thus adapted to transfer height differences from one point to another by means of the laser beam, which is preferably horizontalized, and is adapted to measure height differences, and also the lateral angular displacement of the second point electronically without the necessity of an observer. The measurements may be recorded continuously, by electronic means, and the measurements can be taken without regard to lighting conditions; they can even be taken at night. Moreover, the measurements can be taken over much greater distances than possible with visual observation methods.

The apparatus of this invention may be utilized to measure position coordinates relative to a particular position of the measuring device, but in this case the measurements can only be taken for a small deviation of the position of the measuring device relative to the beam, the maximum measurable deviation being about one-tenth of the beam diameter. This limitation is avoided by having the measuring device movable so as to center itself with the beam and by measuring the amounts and directions of the movements. For this purpose suitable moving means, such as conventional servo mechanisms, are coupled to the phase-selective rectifier to move the measuring device laterally and vertically in response to signals from the phase-selective rectifier until the axis of the laser beam coincides with the axis of rotation of the polarization filter of the measuring device. At this point, since the laser beam is rotation symmetric, the relative rotation of the filter about its center (or the relative rotation of the polarization plane of the beam about the center of the filter) does not produce any appreciable variations in the intensity of current produced by the receiver so that there is no longer any appreciable AC component to actuate the means that are adapted to move the measuring device.

If, during the operation of the apparatus, the laser beam is disturbed by the turbulance of the air between the points to be measured so as to become asymmetrical, a beam axis is still defined by movement of the measuring device in the plane perpendicular to the beam direction until the minimum of the alternating current share is attained.

This apparatus is substantially insensitive to interference by light since daylight and artificial light, which are not polarized, do not produce any alternating current component in the receiver signal. The receiver is also insensitive to slight tilting, which means that an exact angular orientation of the receiver is unnecessary as long as the laser beam can be focused on the photoelectric receiver.

The received laser beam need not be polarized exactly linearly. For example, an elliptical polarization does not cause any direct measuring error, but only reduces the sensitivity.

Since the photoelectric receiver used in this apparatus measures intensities only, in principle, a receiver of any kind may be used, but a phototransistor is particularly suitable. In any event, the sensitivity of the receiver may change, as by aging, without the development of a measuring error, the only requisite being that the sensitivity of the receiver should be constant across its active receiving surface.

The invention is described below in more detail with reference to illustrative embodiments shown in the accompanying drawings in which:

FIG. 2 is a diagrammatic side view of one form of the measuring device of the apparatus;

FIG. 3 is a view showing in front elevation the polarization filter of the measuring device with the axis of the impinging laser beam centered thereon and showing the receiving surface of the receiver with the portion of the beam passing the filter focused thereon;

FIG. 4 is a view similar to the view of FIG. 3 but showing the filter rotated 90° and with the axis of the impinging beam above the center of the filter in the direction of the y-axis;

FIG. 5 is a view similar to the view of FIG. 3 but with the axis of the impinging beam to the right of the center of the filter, in the direction of the x-axis.

Figure 1:
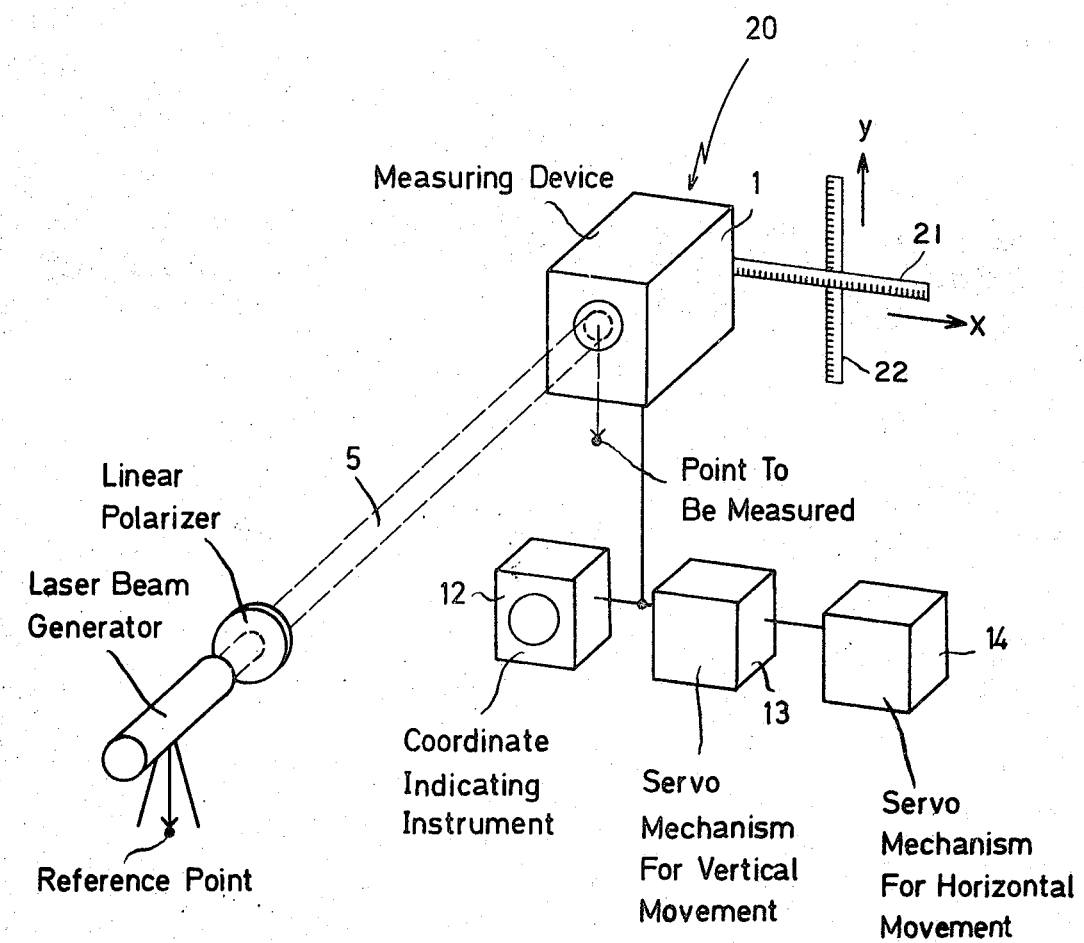
FIG. 1 is a perspective diagrammatic view of measuring apparatus in accordance with the invention.

Referring to FIG. 1 apparatus of the present invention comprises generally means, such as laser beam generator and a linear polarizer associated therewith, as shown, for producing a linearly polarized laser beam 5 which is directed to a measuring device 20. For measuring the coordinates of one point relative to a reference point, the laser beam generator is placed at the reference point and directed so that the laser beam 5, which is preferably horizontalized, impinges upon receiving elements of the measuring device 20 which is placed at the point to be measured. The measuring device is adapted to measure the coordinates of the point of impingement of the center of the laser beam with respect to a point on the measuring device, or, alternatively, is adapted to be moved automatically until the latter point is centered with the point of impingement of the center of the laser beam, the amount of such movement being measured.

FIG. 2 shows one form of measuring device 20 consisting of a housing 1 containing a polarization filter 2, which, as shown in FIGS. 3 to 5, is made up of two semicircular filter parts 3 and 4 whose directions of polarization are perpendicular to each other. The polarization filter 2 has a larger diameter than the laser beam 5 and is mounted to be rotated about its axis by rollers 15 engaging the periphery of the filter, so that the central portion of the filter is unobstructed. The rollers are driven by motor 7.

Behind the filter 2 is a lens 8 which serves to focus the portion of the laser beam passing through the filter onto the receiving surface of a photoelectric receiver 9, which is suitably a transistor photoreceiver. The current thus generated by the receiver is amplified by an amplifier 10 and fed to a phase-selective rectifier 11 which is synchronized with the rotation of the polarization filter 2.

If the laser beam 5 impinges on the filter 2 with its axis coinciding with the center of filter 2, as illustrated in FIG. 3, the beam passing to the photoelectric receiver as the filter rotates will be of constant intensity so that the current generated will be a constant direct current. If the axis of the beam is offset from the center of the filter, as illustrated in FIGS. 4 and 5, the intensity of light passing to the photoelectric receiver will vary in intensity synchronously with the rotation of the filter and the current generated will have an AC component related in value and phase to the variations in the light intensity.

The phase-selective rectifier 11 screens from this current only the AC component of the rotation frequency of filter 2 and transforms it into a DC. All other frequency components and the DC share of the signal occuring at receiver 9 contribute nothing to the direct current signal produced by the rectifier 11.

Coupled to the phase-selective rectifier 11 is a conventional indicating device 12 calibrated to indicate the position coordinates represented by the signals from the rectifier 11. In addition, or as an alternative the housing 1 of the measuring device 20 may be mounted for movement in vertical and horizontal directions and the phase-selective rectifier 11 may be coupled to appropriate means for moving the housing 1 vertically and horizontally in response to signals from the rectifier 12. Such means is suitably provided by a conventional servomechanism 13 for moving the housing 1 vertically, in the $y$ direction, and a conventional servomechanism 14 for moving the housing horizontally, in the $x$ direction. In this case, the amounts and directions of such movements are suitably measured by two scales disposed perpendicularly to each other, such as the $x$ and $y$ scales 21 and 22 associated with the housing 1 as illustrated in FIG. 1.

FIG. 4 illustrated the laser beam 5 offset in the direction of the $y$-coordinate relative to the polarization filter 2. In this case, the receiver 9 furnishes an alternating current besides direct current. The alternating current may be utilized, for instance, to move the housing 1 in $y$ direction by means of the servomechanism 13 until the alternating component disappears from the current. It is also to isolate by means of the phase-selective rectifier 11 that current which develops when the polarization filter 2 is rotated by 90° and 270°.

FIG. 4 also shows the area of receiver 9 upon the rotation of filter 2 by 90° from its position shown in FIG. 3, in which case, the amplitude of the current furnished by receiver 9 is proportional to the $y$-coordinate of the laser beam 5. This $y$-coordinate can therefore be indicated by the indicating instrument 12.

FIG. 5 shows a similar diagram in which the laser beam 5 is laterally offset in the direction of the $x$-coordinate. The phase-selective rectifier here picks up current corresponding to a rotation of the filter disk 2 by 0° and by 360°. This current is directly proportional to the $x$-coordinate and may be indicated on instrument 12 and/or utilized to move housing 1 in $x$ direction until the alternating component disappears.

If the laser beam 5 migrates in the direction of the $x$- and the $y$-coordinates, signals are selected, rectified and indicated by means of the phase-selective rectifier 11 after each rotation of disk 2 by 90°. In this case, therefore, the coordinates are indicated simultaneously in one plane.

Instead of measuring and further processing the pulselike momentary values of the current as described, it is also possible to utilize the entire receiver current. In that case, the phase-selective rectifier 11 consists, exemplarily, of a pole reverser formed by two reversing switches. If it is switched from one position to the other whenever the filter disc assumes the 0° and 180° position, the DC share of the signal at the rectifier output is proportional to a $y$ deviation. If reversal occurs at 90° and 270°, the DC share is proportional to an $x$ deviation.

Figure 6:
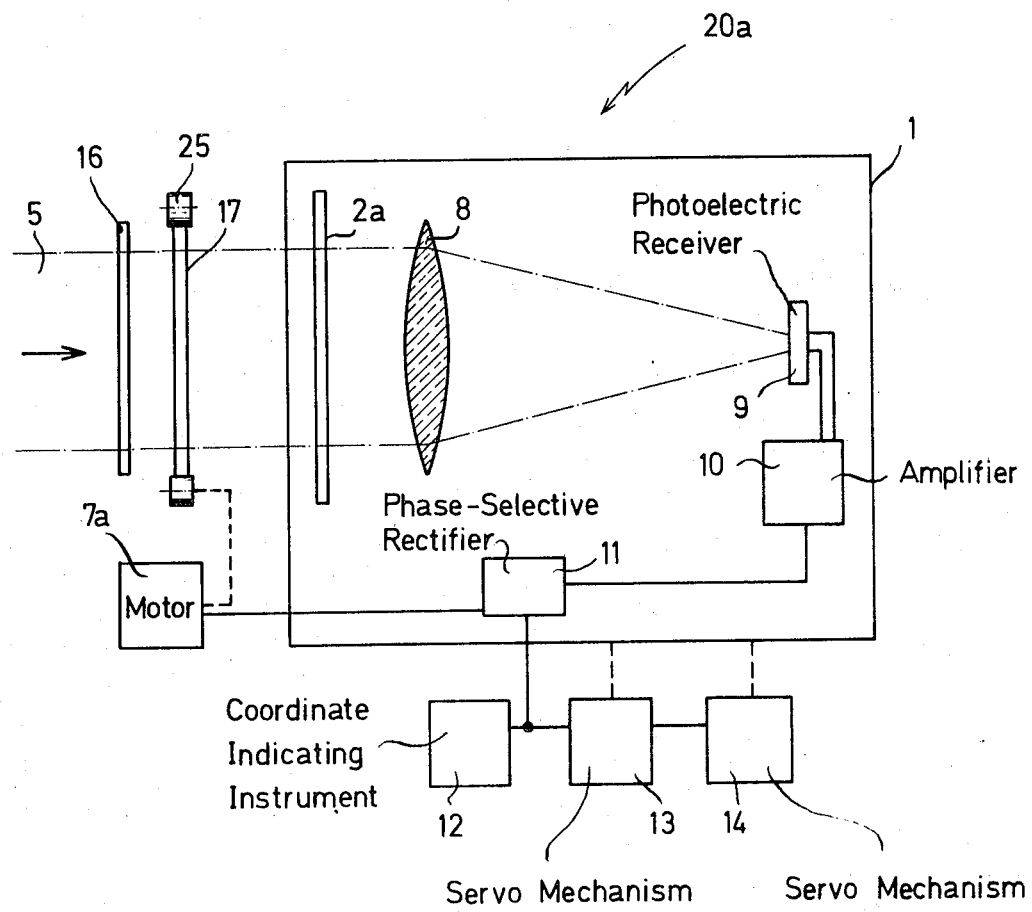
FIG. 6 is a diagrammatic side view of another form of the measuring device of the apparatus of this invention.

In the form of the measuring device 20a illustrated in FIG. 6 the polarization plane of the laser beam 5 is rotated while the two part polarization filter 2a is in fixed position. This is accomplished by a λ/4 disk 16 disposed in front of a simple polarization filter 17. This filter 17 which is in axial alignment with the two part filter 2a is rotatably supported on rollers 25 which are in driving engagement with the periphery of the filter 2a and which are driven by suitable drive connections to a motor 7a. The λ/4 disk 16 transforms the linearly polarized laser beam into a circularly polarized beam which the rotating simple polarization filter 17 transforms into a linearly polarized beam which rotates relative to the two part polarization filter 2a so that the mode of operation is the same as the rotating filter 2 of the FIG. 2 embodiment. The structure and operation of the remaining elements of this FIG. 6 form of measuring device 20a are the same as in the device 20 shown in FIG. 2, and, as described with reference thereto.

What is claimed is:

1. Apparatus for determining the position coordinates of one point relative to a reference point, comprising means for generating a linearly polarized laser beam, and a measuring device placed generally at said one point and in the path of said beam, said device comprising a circular polarization filter in position for said beam to impinge on it and being formed of two semicircular filters whose polarization directions are perpendicular to each other, the diameter of the filter being greater than the diameter of said beam, means for rotating said filter about its center, a lens and a photoelectric receiver in line with the filter for the lens to focus on the receiver a beam impinging on the filter, said receiver producing an electric current in response to the light of said beam focused on it, a phase-selective rectifier coupled to the receiver and synchronized with the rotation of the filter to produce an electric signal in response to a predetermined phase of variations in the current from the receiver, thereby to produce an electric signal whose phase and amplitude represent the angle relative to the center of the filter, and the distance from the center, of the point at which the center of said beam impinges upon the filter.

2. The apparatus of claim 1 in which the filter is rotated by drive means drivingly coupled to its peripheral edge.

3. The apparatus of claim 1 which includes an indicating device coupled to the phase-selective rectifier indicating the coordinates of the points at which the center of a beam impinges upon the filter relative to the center of the filter.

4. The apparatus of claim 1 which includes means coupled to the phase-selective rectifier moving the measuring device to a position in which the current from the receiver does not vary.

5. The apparatus of claim 1 in which the photoelectric receiver is a phototransistor.

* * * * *